US007004688B2

(12) United States Patent
Tasker

(10) Patent No.: US 7,004,688 B2
(45) Date of Patent: Feb. 28, 2006

(54) GAS POWERED VARIABLE SPEED HOPPERLESS VACUUM

(76) Inventor: Donald R. Tasker, 3982 Red Root Rd., Lake Orion, MI (US) 48360

( * ) Notice: Subject to any disclaimer, the term of this patent is extended or adjusted under 35 U.S.C. 154(b) by 0 days.

(21) Appl. No.: 10/895,368

(22) Filed: Jul. 21, 2004

(65) Prior Publication Data

US 2006/0018722 A1 Jan. 26, 2006

(51) Int. Cl.
*B60P 1/60* (2006.01)

(52) U.S. Cl. .......................................... 406/39; 406/38

(58) Field of Classification Search .................. 406/38, 406/39, 115, 135, 109, 63
See application file for complete search history.

(56) References Cited

U.S. PATENT DOCUMENTS 2,381,762 A * 8/1945 McConkle .................. 406/115
3,155,431 A 11/1964 Baldwin
4,118,826 A 10/1978 Kaeser
5,195,209 A 3/1993 Watkins
5,791,568 A 8/1998 Keim
6,086,002 A 7/2000 Frazier et al.
6,142,714 A * 11/2000 Montag ....................... 406/58
6,247,876 B1 6/2001 Stephens

* cited by examiner

*Primary Examiner*—James R. Bidwell
(74) *Attorney, Agent, or Firm*—Richard C. Litman

(57) ABSTRACT

A gas-powered, variable speed vacuum-blower device, which has as its primary purpose the pneumatic conveying of loose, granular material in accomplishing landscaping tasks. The vacuum-blower device is mounted on a hand truck for easy portability. Suction and discharge hoses are disposed on the device for conveying and distributing the loose material. Control means are provided at the distal ends of each hose whereby the speed of the device may be controlled for efficiency and safety.

17 Claims, 8 Drawing Sheets

GAS POWERED VARIABLE SPEED HOPPERLESS VACUUM

BACKGROUND OF THE INVENTION

1. Field of the Invention

The present invention generally relates to pneumatic conveyor devices. More specifically, the present invention is drawn to a portable, hopper-free, vacuum and blower adapted to convey landscaping material.

2. Description of the Related Art

Landscaping requires a great deal of manual labor in that large amounts of loose or granular materials such as mulch, seed, lawn or garden treatment chemicals, etc. must be moved and evenly spread. Traditionally, a wheelbarrow, shovel, rake and fertilizer spreaders have been the primary means for moving and spreading the materials. A portable, efficient and safe device for accomplishing this task would certainly be a welcome addition to the art especially, for home and small business landscaping chores.

There are many conveyor devices in the related art that are utilized to convey granular or particulate material. An example of which is shown in U.S. Pat. No. 5,791,568 (Keim). The instant patent discloses apparatus for vacuuming and chopping material such as leaves, grass clippings and the like. There is no provision made for portability nor is there an indication that the apparatus may be used to spread granular materials.

U.S. Pat. No. 5,195,209 (Watkins) is drawn to a gutter cleaning system that employs a canister type vacuum cleaner. A hopper is utilized to collect the debris from the gutter and there is no contemplation for transferring granular material for landscaping.

U.S. Pat. No. 4,118,826 (Kaeser) discloses a mobile blower unit. The unit is effective to merely blow leaves and debris from a lawn, driveway or other surface for later collection thereof.

U.S. Pat. No. 6,086,002 (Frazier et al.) discloses a vacuum and spreading system that includes a hydraulic tank and a fragmenting chamber. The system is too complicated for use by a home or small business owner.

U.S. Pat. No. 3,155,431 (Baldwin) shows a portable pneumatic conveyor for handling grains and other fluent material. The conveyor does not change the character of the material.

U.S. Pat. No. 6,247,876 B1 (Stephens) shows a portable, gas powered, pneumatic transport device. The instant device has no provision for commutation or for controlling the blower speed from the ends of the suction and discharge tubes.

None of the above inventions and patents, taken either singly or in combination, is seen to disclose a portable, pneumatic transport device having features as will subsequently be described and claimed in the instant invention.

SUMMARY OF THE INVENTION

The present invention is a gas-powered, variable speed vacuum-blower device, which has as its primary purpose the pneumatic conveying of loose or granular material in accomplishing landscaping tasks. The vacuum-blower device is mounted on a hand truck for easy portability. Suction and discharge hoses are disposed on the device for conveying and distributing the loose material. Control means are provided at the distal ends of each hose whereby the speed of the device may be controlled for efficiency and safety. An accessory is provided whereby the discharge hose can function to effectively spread grass seed, granular lawn chemicals and the like. Another accessory, attached to the suction hose, allows the device to function as a gutter cleaner. A third accessory allows the device to function as a yard vacuum and a fourth accessory allows the device to be operated by a single user.

Accordingly, the instant invention presents a gas-powered suction-blower that enhances the movement of loose, granular, landscaping material from one location to another without the need of hand tools such as a wheelbarrow or shovel. Control means are employed for controlling the speed of the blower to enhance safety and increase efficiency. The blower fan also functions to commutate loose material conveyed therethrough. The blower is mounted on a dolly for portability. The invention provides for improved elements and arrangements thereof for the purposes described which are inexpensive, dependable and fully effective in accomplishing their intended purposes.

A clear understanding of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
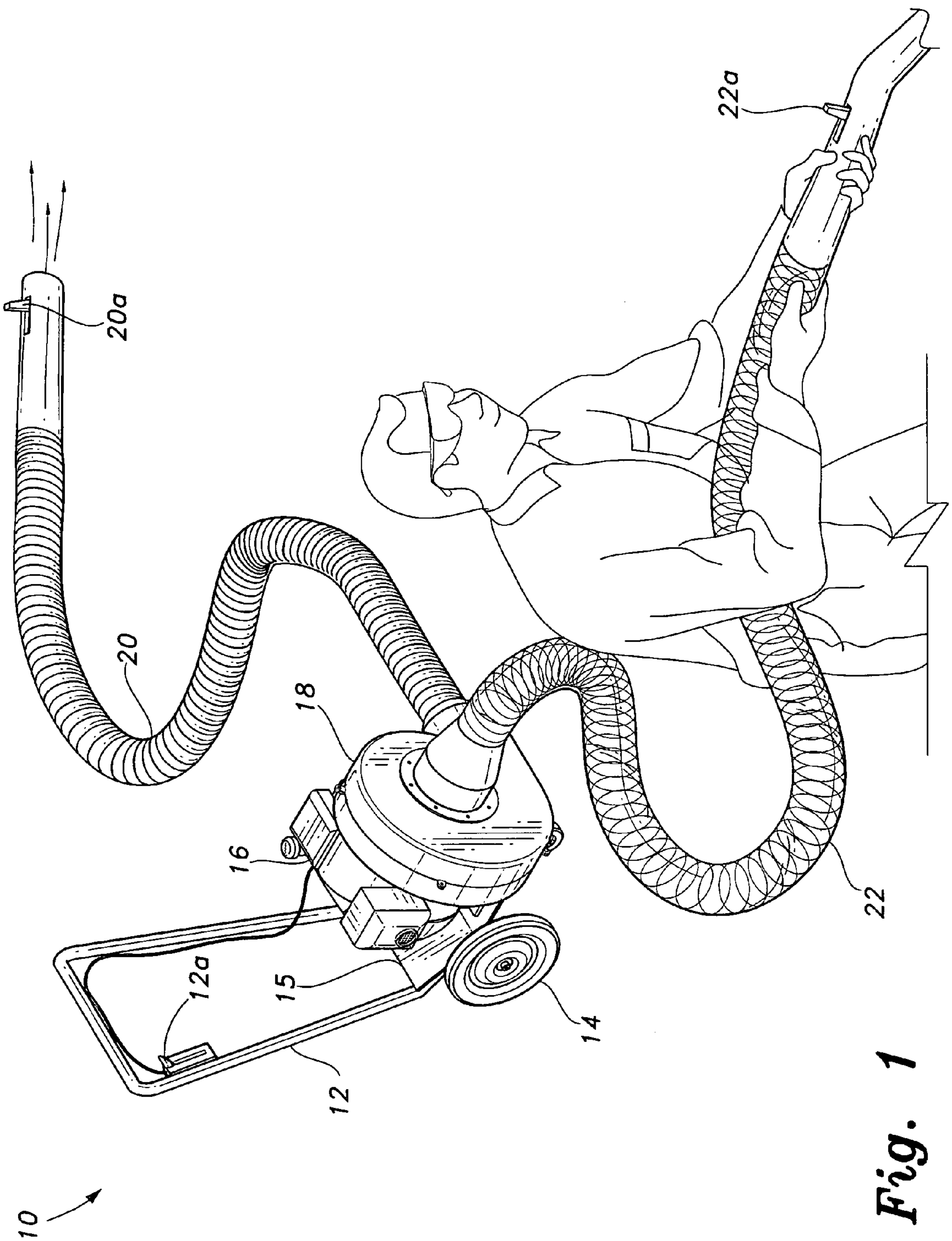
FIG. 1 is an environmental, perspective view of a gas-powered, variable-speed, hopper-free, pneumatic transport device according to the present invention.
Figure 2:
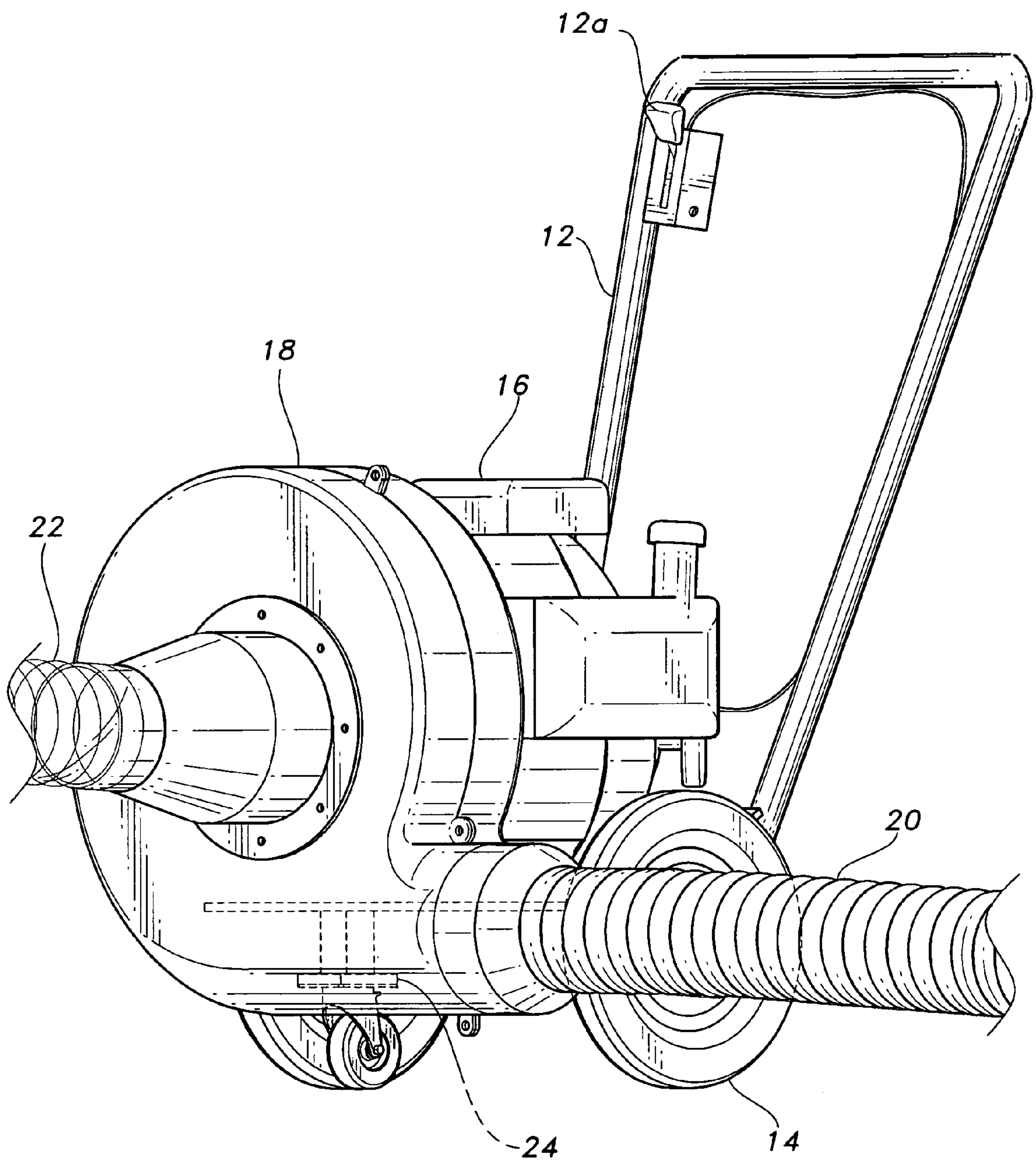
FIG. 2 is a perspective, front view of a pneumatic transport device according to the present invention.
Figure 3:
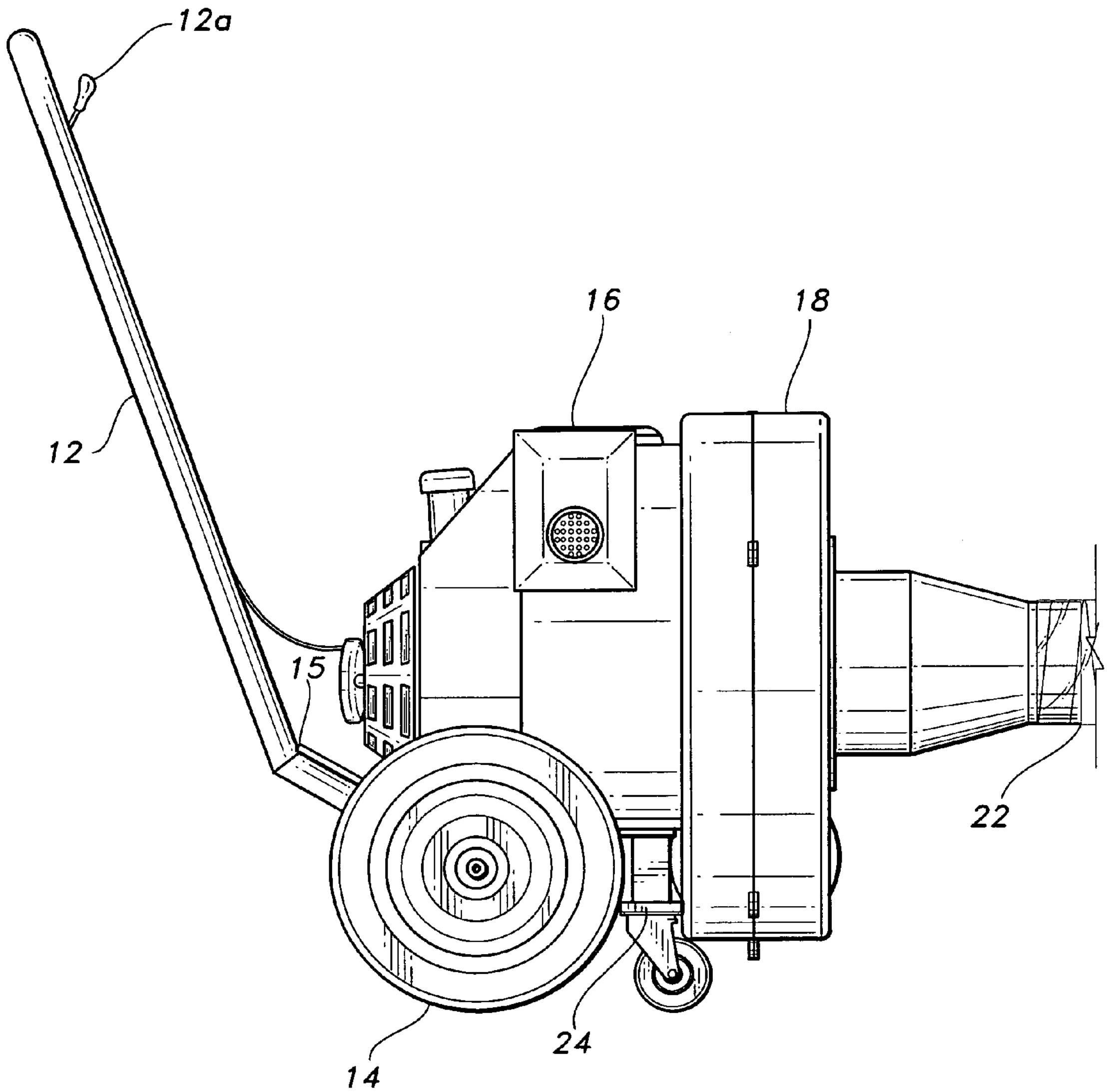
FIG. 3 is a perspective, side view of a pneumatic transport device according to the present invention.

Attention is first directed to FIGS. 1–3 wherein the pneumatic transport device is generally indicated at 10 (FIG. 1). Device 10 comprises a dolly or hand truck having a handle 12. A platform 15 secured to the lower portion of the handle. A variable-speed gasoline engine 16 and fan housing 18 are mounted on platform 15. Wheels 14 are attached to the undersurface of platform 15 so that the unit may be easily moved. A throttle **12*a* is wired to engine 16 for starting and adjusting engine speed. A first hose 22 has its proximate end attached to the suction port of housing 18. A second hose 20 has its proximate end attached to the blower port of housing 18. Control throttles 20*a* and 22*a* are positioned adjacent the distal end of each respective hose. Control throttles 20***a* and 22*a* are wired (not shown) to engine 16 and function as a safety shut-off and to control the speed of the engine. Hoses 20 and 22 are fabricated from flexible, highly compressible, material to enhance manipulation and storage. A swivel wheel member 24 is attached to the undersurface of platform 15 and provides a stable and mobile support for the hand truck.

Figure 4:
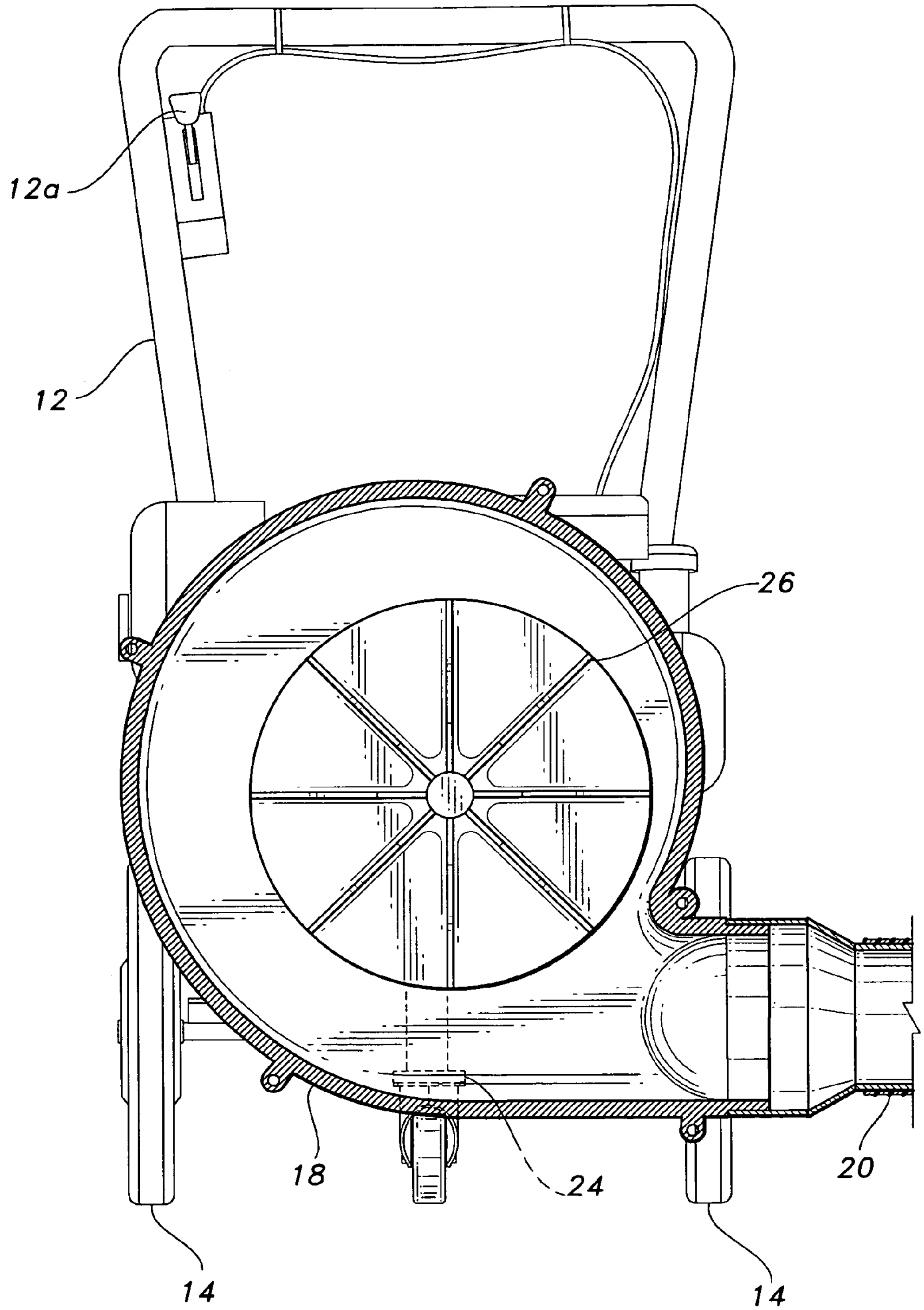
FIG. 4 is a partial, cut-away view of a fan housing of a pneumatic transport device according to the present invention.

As best seen in FIG. 4, housing 18 encloses a radial wheel blower 26. Blower 26 is fabricated from cast aluminum or welded steel. The blower is of open radial design and functions to contact and fragment material traversing the fan housing.

Figure 5:
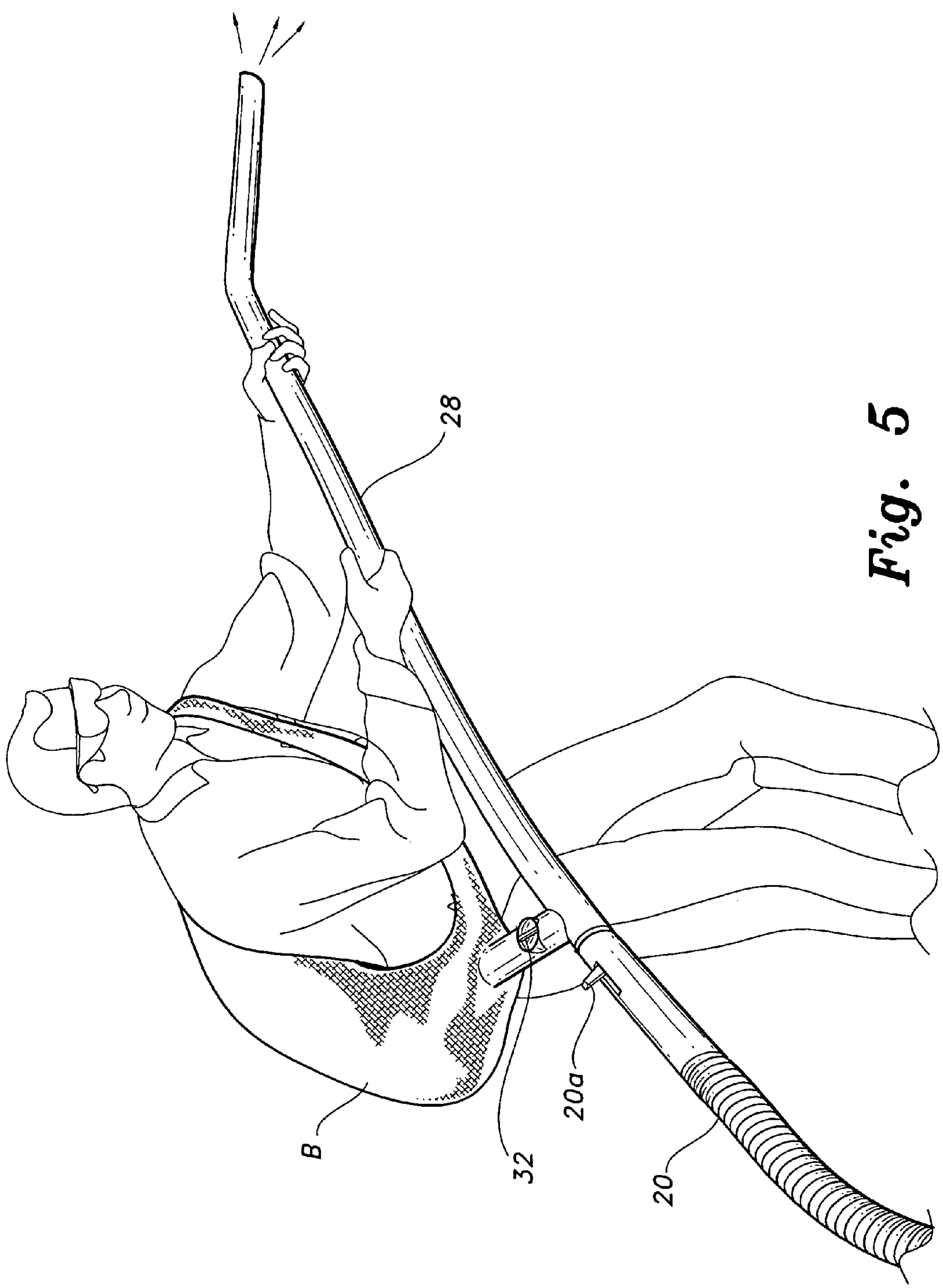
FIG. 5 is a partial, perspective view of a feeding accessory utilized with a pneumatic transport device according to the present invention.
Figure 6:
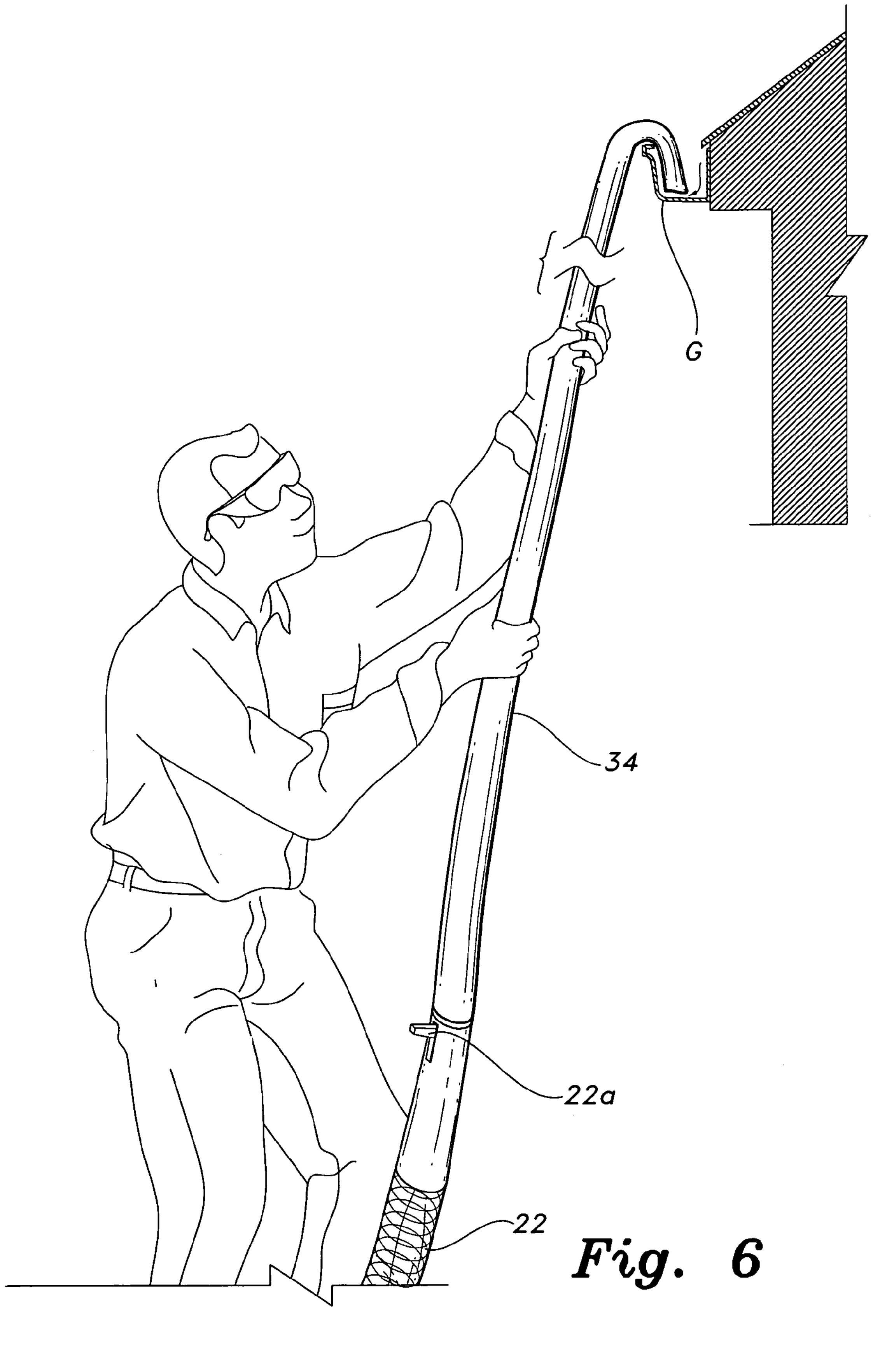
FIG. 6 is a partial, perspective view of a gutter-cleaning accessory utilized with a pneumatic transport device according to the present invention.

FIG. 5 is illustrative of a material-spreading wand 28, which wand may be removably secured to the end of hose 20. A conduit having a feed control valve 32 therein transfers particulate material (seeds, chemicals, etc.) from bag B to wand 28, which material is then dispersed on the lawn. In FIG. 6, an accessory 34 having a hooked end is attached to suction hose 22. This arrangement presents an effective and efficient means for cleaning a gutter G.

Figure 7:
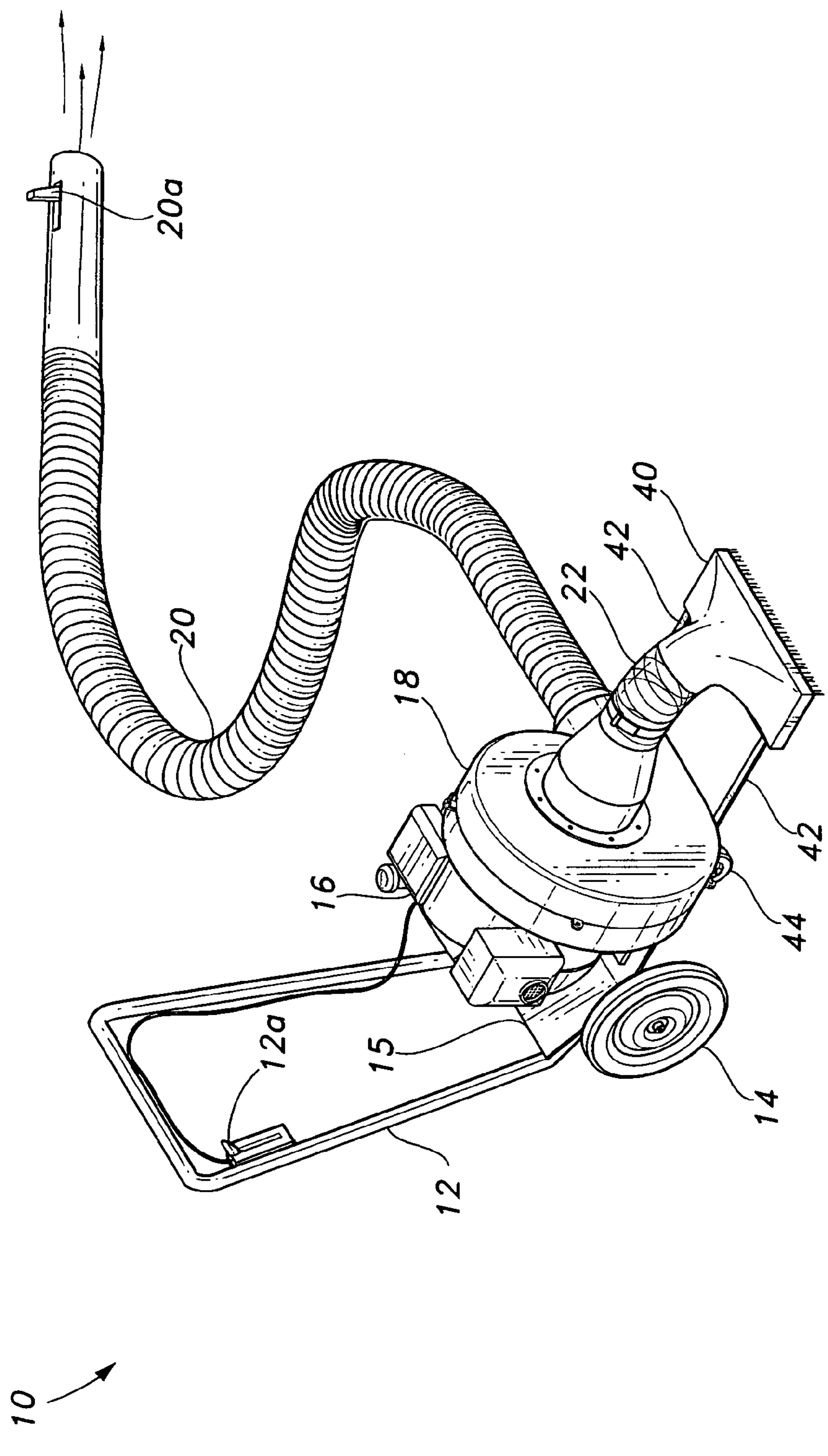
FIG. 7 is a perspective view of a yard vacuum accessory utilized with a pneumatic transport device according to the present invention.

The embodiment illustrated in FIG. 7 incorporates a vacuum head 40, which head is secured on metal brackets 42 and supported by a pair of wheels 44 (only one is shown). The vacuum head is attached to the suction portal by a short hose 22. The vacuum head would be employed to facilitate lawn cleanup.

Figure 8:
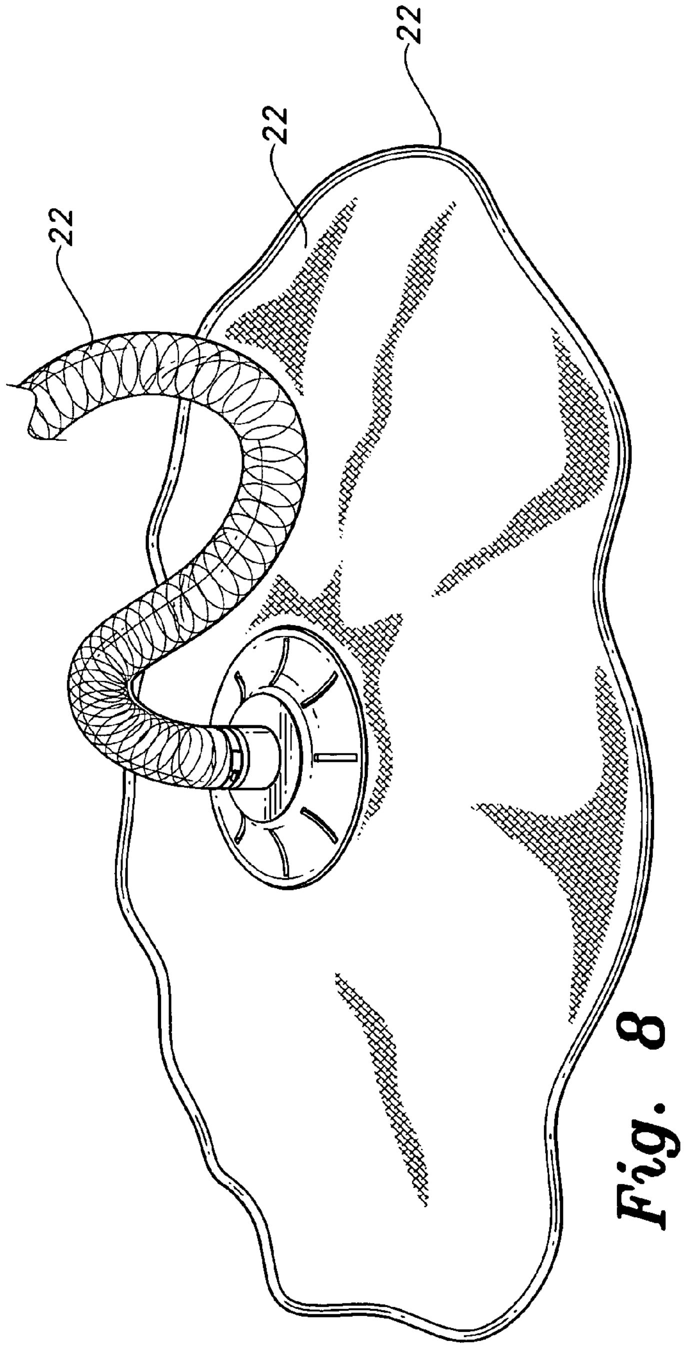
FIG. 8 is a perspective view of a blanket accessory utilized with a pneumatic transport device according to the present invention.
Figure 9:
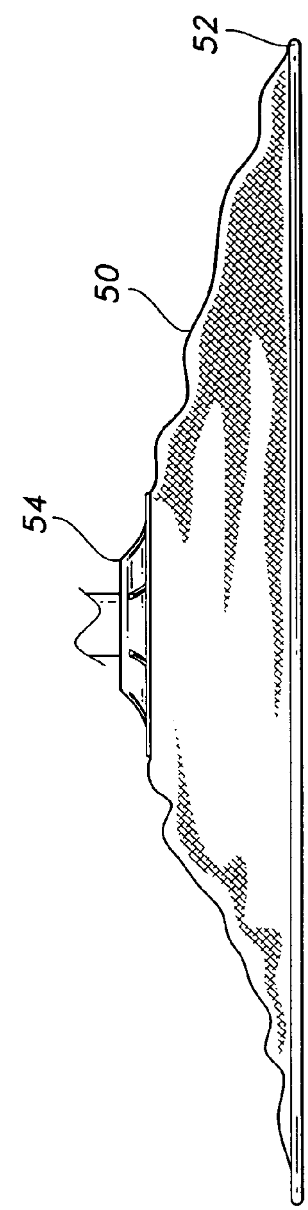
FIG. 9 is a side view of a blanket accessory utilized with a pneumatic transport device according to the present invention.

FIGS. 8 and 9 are drawn to an accessory that eliminates the need for a second person when performing certain operations. A blanket 50 fabricated from a durable flexible material (plastic, vinyl, etc.) is adapted to be placed over a pile of loose or granular material. A weighted perimeter 52 is provided to stabilize the blanket on the pile of material. A vacuum head 54 having an array of air holes spaced therearound is disposed at the central area of the blanket. Suction hose 22 is attached to head 54 for suctioning the looser granular material therethrough.

It is to be understood that the present invention is not limited to the embodiments described above, but encompasses any and all embodiments within the scope of the following claims.

What is claimed is:

1. A pneumatic transport device for transporting loose granular material therethrough comprising:

a hand truck, said hand truck having a handle;

a platform secured to said handle;

a gasoline powered, variable-speed engine disposed on said platform;

a fan housing having a radial blower blade therein, said fan housing disposed on said platform and operatively connected to said variable-speed engine;

a discharge port disposed on said fan housing;

a suction port disposed on said fan housing;

a first hose having a proximate end and a distal end, wherein said proximate end of said first hose is attached to said suction port;

a second hose having a proximate end and a distal end, wherein said proximate end of said second hose is attached to said discharge port; and a throttle positioned adjacent said proximate end of said first hose for controlling the speed of said variable-speed engine.

2. A pneumatic transport device as recited in claim 1, wherein said first hose and said second hose are fabricated from flexible, highly compressible, material.

3. A pneumatic transport device as recited in claim 1, wherein said platform has an undersurface and wherein a pair of wheels is attached to said undersurface.

4. A pneumatic transport device as recited in claim 3, including a swivel support wheel attached to said undersurface.

5. A pneumatic transport device as recited in claim 1, wherein said blower blade is fabricated from a durable metal and is effective to fragment the granular material.

6. A pneumatic transport device as recited in claim 1, including a feeding wand, said feeding wand removably attached to the distal end of said second hose.

7. A pneumatic transport device as recited in claim 1, including a suction wand, said suction wand removably attached to the distal end of said first hose.

8. A pneumatic transport device for transporting loose granular material therethrough comprising:

a hand truck, said hand truck having a handle;

a platform secured to said handle;

a gasoline powered, variable-speed engine disposed on said platform;

a fan housing having a radial blower blade therein, said fan housing disposed on said platform and operatively connected to said variable-speed engine;

a discharge port disposed on said fan housing;

a suction port disposed on said fan housing;

a first hose having a proximate end and a distal end, wherein said proximate end of said first hose is attached to said suction port;

a second hose having a proximate end and a distal end, wherein said proximate end of said second hose is attached to said discharge port; and a first throttle positioned adjacent said proximate end of said second hose for controlling the speed of said variable-speed engine.

9. A pneumatic transport device as recited in claim 8, wherein said first hose and said second hose are fabricated from flexible, highly compressible, material.

10. A pneumatic transport device as recited in claim 9, wherein said platform has an undersurface and wherein a pair of wheels is attached to said undersurface.

11. A pneumatic transport device as recited in claim 10, including a swivel support wheel attached to said undersurface.

12. A pneumatic transport device as recited in claim 8, wherein said blower blade is fabricated from a durable metal and is effective to commutate the granular material.

13. A pneumatic transport device as recited in claim 8, including a feeding wand, said feeding wand removably attached to the distal end of said second hose.

14. A pneumatic transport device as recited in claim 8, including a vacuum head, said vacuum head removably attached to the distal end of said first hose.

15. A pneumatic transport device as recited in claim 14, wherein said vacuum head includes a pair of brackets and wherein said vacuum head is mounted on said pair of brackets.

16. A pneumatic transport device as recited in claim 14, wherein said vacuum head includes a blanket said blanket having a weighted perimeter.

17. A pneumatic transport device as recited in claim 8, wherein a gutter cleaning accessory is attached to said distal end of said first hose.

* * * * *